US 9,998,494 B2

(12) United States Patent
Nairn et al.

(10) Patent No.: US 9,998,494 B2
(45) Date of Patent: Jun. 12, 2018

(54) METHODS AND APPARATUS FOR SECURE COMMUNICATION IN A VEHICLE-BASED DATA COMMUNICATION SYSTEM

(71) Applicant: GM GLOBAL TECHNOLOGY OPERATIONS LLC, Detroit, MI (US)

(72) Inventors: David M. Nairn, Plymouth, MI (US); Thomas M. Forest, Macomb, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days. days.

(21) Appl. No.: 14/481,043

(22) Filed: Sep. 9, 2014

(65) Prior Publication Data
US 2015/0082380 A1 Mar. 19, 2015

Related U.S. Application Data

(60) Provisional application No. 61/877,818, filed on Sep. 13, 2013.

(51) Int. Cl.
*H04L 29/06* (2006.01)
(52) U.S. Cl.
CPC ........ *H04L 63/1466* (2013.01); *H04L 63/126* (2013.01)
(58) Field of Classification Search
CPC ... H04L 63/126; H04L 63/1466; H04L 63/12; H04L 63/1441
USPC .......................................................... 713/170
See application file for complete search history.

(56) References Cited

U.S. PATENT DOCUMENTS

| 8,037,296 B2* | 10/2011 | Kune ..................... H04L 63/123 380/255 |
| 2004/0098485 A1* | 5/2004 | Larson .............. H04L 29/12066 709/227 |
| 2008/0270798 A1* | 10/2008 | Charles ................. H04L 9/3247 713/176 |
| 2014/0270163 A1* | 9/2014 | Merchan ............... H04L 9/0637 380/46 |

FOREIGN PATENT DOCUMENTS

CN 102484636 A 5/2012

OTHER PUBLICATIONS

Chung-Wei Lin & Alberto Sangiovanni-Vincentelli, "Cyber-Security for the Controller Area Network (CAN) Communication Protocol", University of California, Berkeley, 2012 International Conference on Cyber Security, IEEE, 2012, pp. 1-7.*
State Intellectual Property Office of the People's Republic of China, Office Action in Chinese Patent Application No. 201410565743.3 dated Mar. 29, 2017.

* cited by examiner

*Primary Examiner* — Joseph P Hirl
*Assistant Examiner* — Chi Nguy
(74) *Attorney, Agent, or Firm* — Lorenz & Kopf, LLP

(57) ABSTRACT

A method provides secure communication between a first module and a second module within a vehicle communication network. A first anti-replay counter is provided within the first module, and a second anti-replay counter is provided within the second module. A message is transmitted from the first module to the second module over the vehicle communication network. The message includes a partial counter including only a portion of the contents of the first anti-replay counter, and the message is authenticated based on the partial counter.

17 Claims, 3 Drawing Sheets

METHODS AND APPARATUS FOR SECURE COMMUNICATION IN A VEHICLE-BASED DATA COMMUNICATION SYSTEM

CROSS-REFERENCE TO RELATED APPLICATIONS

This application claims priority to U.S. Provisional Patent Application No. 61/877,818, filed Sep. 13, 2013.

TECHNICAL FIELD

Embodiments of the subject matter described herein relate generally to vehicle-based data communication systems and networks, and more particularly, embodiments of the subject matter relate to methods and systems for secure communication within such systems.

BACKGROUND

Vehicles are increasingly employing sophisticated internal communication systems and networks allowing the exchange of data between the various modules and components within the vehicle. Since such communication systems typically include a data bus interconnecting all the modules, such that any module on the bus may send messages to any other module on the bus, it is desirable to provide authentication of messages sent from one module to another over the data bus in order to prevent replay-attacks, denial-of-service attacks, and other such security issues.

While it would be desirable to transmit security-related data within the payload of each message transmitted over the bus (e.g., in the form of an anti-replay attack counter), the size of the payload used for typical messages cannot accommodate such data. For example, in a system that utilizes a message payload of 64 bits, it would be impractical to use a significant portion of that payload for a counter that might itself be 32-64 bits. Furthermore, it is common for messages to be sent over the bus at a high periodic rate (e.g., once every 10 ms). Transmitting additional data (such as a 64-bit anti-replay attach counter) at that rate would undesirably increase bus utilization.

Accordingly, there is a need for improved systems and methods for providing secure communication in the context of vehicle communication systems.

BRIEF SUMMARY

In accordance with one embodiment, a method for providing secure communication between a first module and a second module within a vehicle communication network includes providing, within the first module, a first anti-replay counter; providing, within the second module, a second anti-replay counter; transmitting a message from the first module to the second module over the vehicle communication network, wherein the message includes a partial counter including only a portion of the contents of the first anti-replay counter; and authenticating the message based on the partial counter.

A secure communication system for a vehicle in accordance with another embodiment includes a first module having a first anti-replay counter, the first module configured to transmit a message over a vehicle communication network, and a second module having a second anti-replay counter, the second module configured to receive the message over the vehicle communication network. The message includes a partial counter including only a portion of the contents of the first anti-replay counter; and the second module is configured to authenticate the message based on the partial counter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The subject matter described herein generally relates to the use of anti-replay counters in connection with communication of authenticated messages between modules on a bus, wherein, to reduce bus utilization, only a portion of the counter (e.g., n lowest significant bits of the full counter, where n is less than the full bit-length of the counter) is included in the payload of the message. This in effect provides some level of "tolerance" for synchronization (as determined by the size of n). Synchronization may be further improved by the transmission (at a significantly lower rate) of a counter synchronization (or simply "counter sync") message that includes the full counter, while a tentative counter or "last good counter" are selectively employed to verify the authenticity of received messages—e.g., via the message's Message Authentication Code (MAC).

Figure 1:
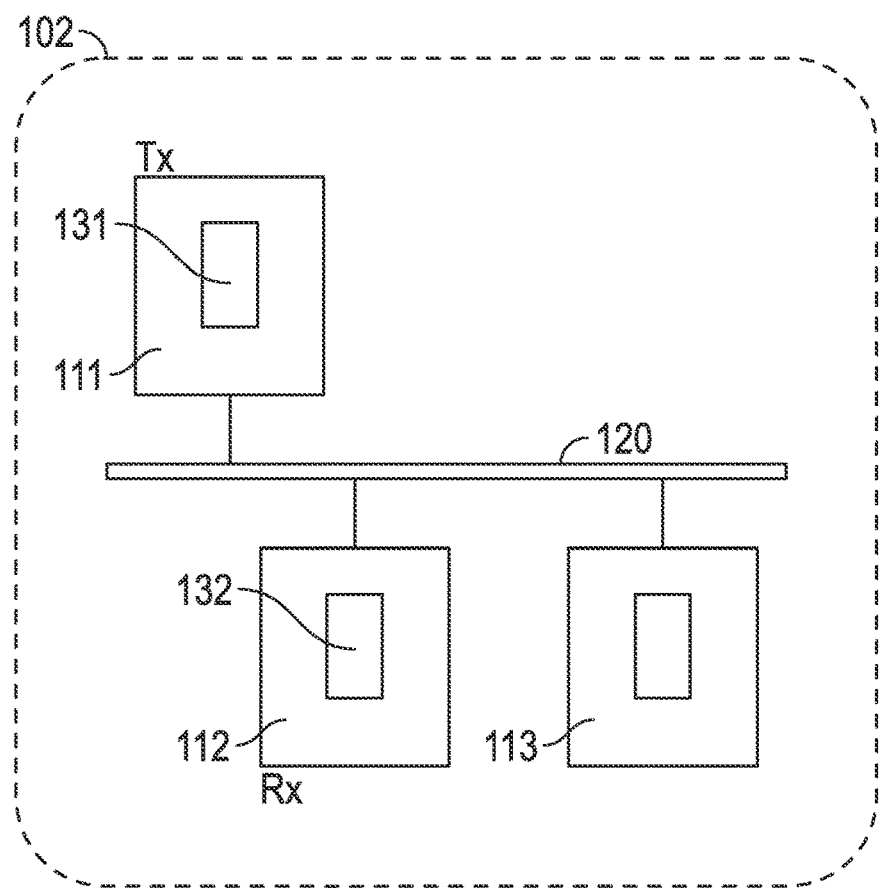
FIG. 1 is a conceptual block diagram depicting a vehicle-based data communication system in accordance with various embodiments.

FIG. 1 is a conceptual block diagram depicting, in the general sense, a vehicle-based data communication system useful in describing various embodiments. As shown, a vehicle 102 includes a data bus 120 configured to allow communication between various modules (e.g., modules 111, 112, and 113) within vehicle 102. Each module 111-113 corresponds to a separate vehicle system, subsystem, component, or the like that is configured to securely transmit and/or receive messages via bus 120. Vehicle 102 might include any number of such modules, such as an engine control unit (ECU) and a variety of additional modules and subsystems that traditionally communicate with the ECU.

Each module 111-113 is configured to place (or "transmit") messages onto bus 120 and/or monitor the bus 120 for messages addressed to itself (i.e., "receive" messages). For example, module 111 might correspond to an ECU and module 112 might correspond to a transmission control module configured to appropriately respond to messages (e.g., torque-related messages) from module 111. Bus 120 includes any suitable physical or logical means of connecting computer systems and components, including, but not limited to, direct hard-wired connections, fiber optics, infrared and wireless bus technologies. Bus 120 may utilize any suitable vehicle communication protocol. For purposes of discussion, a particular module might be described herein as a "transmitter," and another as a "receiver." It will be appreciated, however, that each module 111-113 might effectively act as both a receiver and a transmitter during normal operation. In that regard, each module 111-113 may include various processors, memory devices, storage units, and the like configured to execute machine-readable software instructions, as is known in the art.

Vehicle 102 (as well as each of the target vehicles and third vehicles) may be any one of a number of different types of automobiles, such as, for example, a sedan, a wagon, a truck, or a sport utility vehicle (SUV), and may be two-wheel drive (2 WD) (i.e., rear-wheel drive or front-wheel drive), four-wheel drive (4 WD) or all-wheel drive (AWD). Vehicle 102 may also incorporate any one of, or combination of, a number of different types of propulsion systems, such as, for example, a gasoline or diesel fueled combustion engine, a "flex fuel vehicle" (FFV) engine (i.e., using a mixture of gasoline and ethanol), a gaseous compound (e.g., hydrogen or natural gas) fueled engine, a combustion/electric motor hybrid engine, and an electric motor.

In the context of secure communication of an authenticated message from module 111 to module 112 via bus 120, module 111 employs a counter 131 (the "authoritative counter"), and module 112 employs a counter 132 (the "local" or "applicable" counter, as discussed in further detail below). Modules 111 and 112 will generally each include a separate counter 132 for each uniquely identified message (which will depend upon the nature of the modules themselves, as is known in the art). In the interest of clarity, only one such counter is illustrated in the example embodiment.

As detailed below, counters 131 and 132 are "anti-replay" in the sense that they are used to prevent replay attacks from malicious modules or the like that might have access to bus 120. Counters 131 and 132 are preferably large enough that they do not roll over or are not exhausted during the life of vehicle 102 given the frequency with which messages that are likely to be sent over bus 120. In one embodiment, for example, counters 131 and 132 are each 64 bits in length. This length will generally accommodate, for example, messages that are sent periodically every 10 ms for 30 years. In other embodiments, more or less bits are employed.

Figure 2:
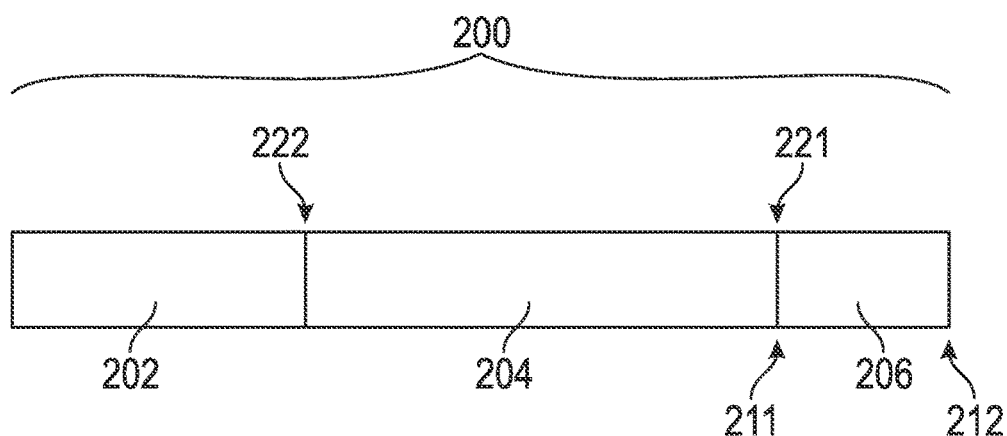
FIG. 2 is a conceptual overview of an authenticated message payload in accordance with various embodiments.

Referring now to FIG. 2 in conjunction with FIG. 1, FIG. 2 presents a conceptual overview of an authenticated message payload 200 in accordance with various embodiments. For brevity, the authenticated message payload 200 may be referred to below simply as the "message payload" or "message." As shown, authenticated message payload 200 includes a first segment 202 including transmit data (e.g., the particular command or message being sent from one module to another), a second segment 204 (a "partial counter") including only a portion of the anti-replay counter (e.g., authoritative counter 131 of module 111), and a third segment 206 including a message authentication code (MAC) (from bit 211 to bit 212) associated with payload 200.

In the illustrated embodiment, segment 204 includes the n least significant bits (LSB) of the anti-replay counter 131 (from bit 221 to bit 222). The value of n may vary, depending upon design considerations. As the value of n increases, the effective "tolerance" for authentication increases (as described below), as does the number of bits of payload 200 required for transmission of the anti-replay counter. In some embodiments, n ranges from 4 to 7 bits. In some embodiments, n is approximately 7 to 10 percent of the total length of authoritative counter 131.

MAC 206 comprises a short series of bits used to authenticate payload 200 and is generated, as is known in the art, via a suitable MAC algorithm. The MAC algorithm (performed, e.g., by Tx 111) generally accepts as input a secret key and an arbitrary-length message to be authenticated (e.g., transmit data 202 and/or partial counter 204), and outputs the MAC 206. The MAC 206 thus protects both a message's data integrity as well as its authenticity, by allowing verifiers (e.g., Rx 112, who also possesses the secret key) to detect any changes to the message content.

During normal operation, the system described above may operate as follows. First, it is assumed that one module (e.g., module 111) is the "transmitter", while another module (e.g., module 112) is the "receiver." The transmitter's notion (i.e., what it believes to be true) of the anti-replay counter is the authoritative counter 131, while the receiver's notion of the anti-replay counter is the counter 132. The authenticated message payload 200 includes the n LSB of authoritative counter 131. As will be apparent, including the n LSB of authoritative counter 131 in the authenticated message payload 200 provides tolerance against missing up to about $2^n$ messages while maintaining counter synchronization with the transmitter 111.

Figure 3:
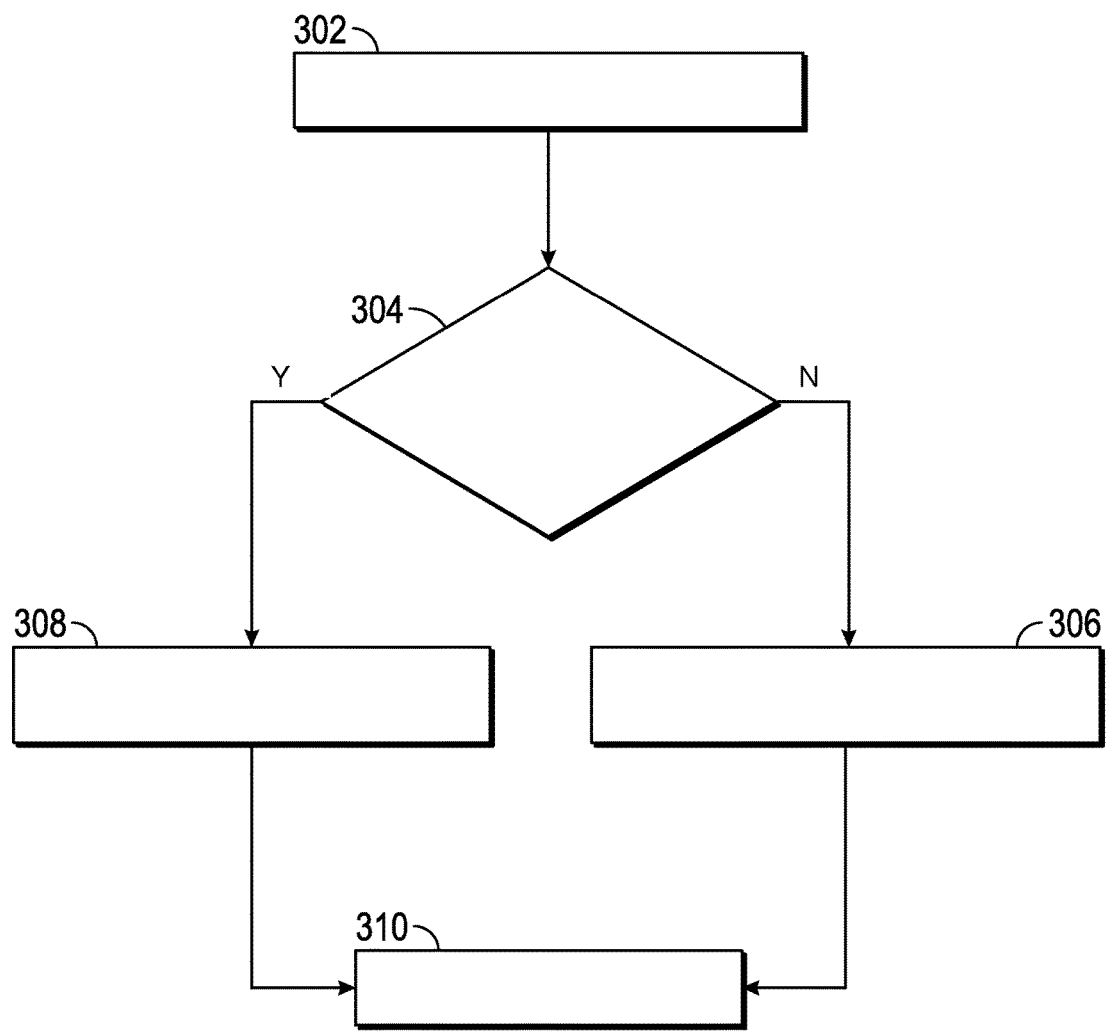
FIG. 3 is a flow chart depicting a method in accordance with various embodiments.

FIG. 3 is a flowchart depicting an exemplary method for providing verification of MAC 204 in a manner that provides a level of "tolerance" for synchronization as mentioned above. Initially, in step 302, the authenticated message (200) is received by Rx 112 (e.g., from Tx 111). Subsequently, in step 304, Rx 112 determines whether the n LSB of the counter received in the message payload 200 (i.e., segment 204) is less than or equal to the n LSB of the "applicable counter." The applicable counter, as will be described in further detail below, will vary depending upon any given embodiment, but for the sake of this discussion will be considered to be the "last good counter" known from previous successful authentications.

If the n bits of the partial counter 204 received in message payload 200 is greater than the n LSB of the applicable counter, the system continues with step 306, and a "temporary counter" is constructed by concatenating the MSB of the applicable counter, plus one, with the n bit partial counter 204. If, however, at branch 304, the n bits of the partial counter 204 in message payload 200 were found to be less than or equal to the n LSB of the applicable counter, the temporary counter is constructed by concatenating the MSB of the applicable counter with the n bit partial counter 204 (step 308).

Finally, at step 310, the system attempts to verify MAC 206 using the temporary counter, the value of which may vary as detailed above. In this way MAC verification is provided in a way that provides some verification tolerance (determined by n) while requiring only a small partial counter value 204 to be sent periodically over the bus 120.

As will now be shown, the method outlined in FIG. 3 can be used in connection with, and a part of, other authentication methods. For example, as mentioned briefly above, some embodiments, synchronization may be further provided (e.g., when the tolerance provided has been exhausted) by the transmission, at a significantly lower rate, of a counter synchronization (or simply "counter sync") message including the full counter (131) while a tentative counter or "last good counter" are selectively employed to verify the authenticity of received messages 200.

More particularly, in accordance with one embodiment, for each authenticated message transmitted at a periodic rate, the system also employs a counter sync message, transmitted at a lower rate (e.g., at about 1/16th of the full rate of the authenticated message payload), which contains the full authoritative counter 131 in the payload region. As will be shown, the counter sync message provides a way to keep the anti-replay counter in-sync between the transmitter (Tx 111) and receiver (Rx 112) of the message 200. Furthermore, by transmitting the counter sync message at a lower rate compared to the message itself, the overall impact on bus 120 utilization is limited.

Figure 4:
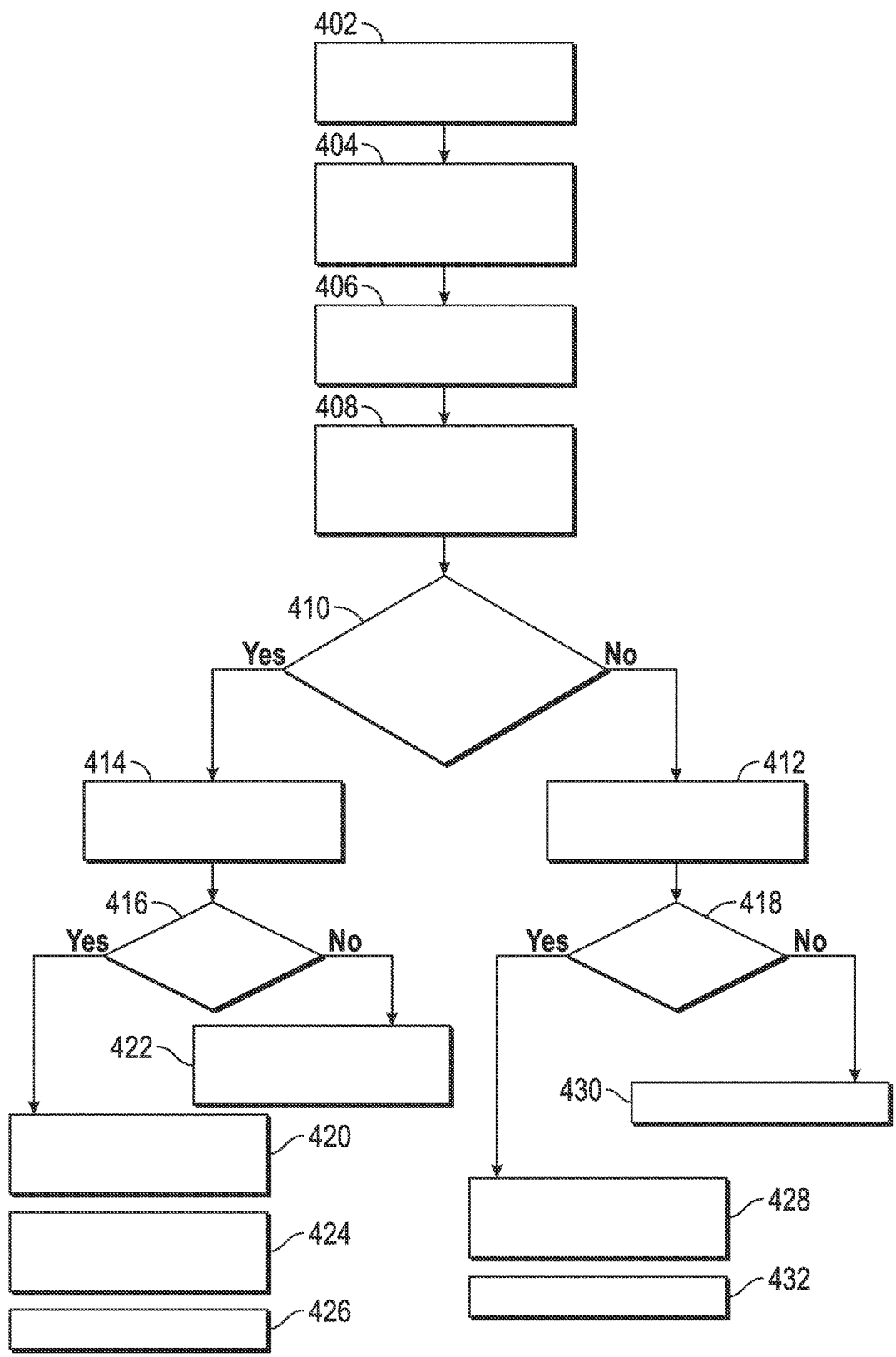
FIG. 4 is a flow chart depicting a method in accordance with various embodiments.

FIG. 4 provides a detailed flow chart of such a method, and begins with the receipt of a counter sync message (e.g., a message whose entire payload contains the full counter 131, without any form of MAC) (step 402). That counter sync message is then stored as a "tentative counter" (which, at this point, cannot be trusted) (step 404). Next, a "tentative-counter-state" is set to active (step 406). The tentative-counter-state is a stored binary state (ACTIVE, INACTIVE) that specifies whether a tentative counter has been previously stored at step 404.

Next, at step 408, the system waits for an authenticated message 200, after which the system queries whether the tentative-counter-state is set to ACTIVE. If so, the process continues to step 414, and sets the "applicable counter" to the tentative counter. The system then tries to verify MAC 206 using the applicable counter (step 416). The MAC verification may be performed in a number of ways. In one embodiment, for example, the method described in FIG. 3 (which provides for authentication tolerance) may be used in place of step 416.

If verification is successful in step 416, the system sets the "last good counter" to the temporary counter (step 420) as described early with respect to FIG. 3. The system then sets the tentative-counter-state to INACTIVE (step 424), and continues with the verified MAC (step 426). If, at step 416, the MAC could not be verified, the system continues with step 422 and sets the tentative-counter-state to INACTIVE, effectively ignoring the transmit data 202 of message 200. In an alternative to step 420, in which the last good counter is set to the tentative counter after only one successful MAC verification, the system may wait until a predetermined number of such verifications have been performed (e.g., 2, 3, or more successful verifications).

If previously at step 410 it was determined that the tentative-counter-state was not set to ACTIVE, the system continues with step 412, and sets the applicable counter to the last good counter, after which the system attempts to verify the MAC (step 418). As with step 416, the method of FIG. 3 may be used in place of step 418. If the MAC has been verified, the system continues sets the last good counter to the temporary counter (step 428), and continues with the verified MAC (step 432). If not, the system, at step 430, ignores the content of transmit data 202 and effectively waits for the process to cycle through again (e.g., receiving another counter sync message and waiting for a corresponding authenticated message).

In summary, the foregoing describes the use of anti-replay counters in connection with communication of authenticated messages between modules on a bus, wherein, to reduce bus utilization, only a portion of the counter is included in the payload of the message. Synchronization is further provided by the transmission (at a significantly lower rate) of a counter synchronization message including the full counter, while a tentative counter is selectively employed to verify, temporarily, the authenticity of received messages.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application. Accordingly, details of the exemplary embodiments or other limitations described above should not be read into the claims absent a clear intention to the contrary.

The invention claimed is:

1. A method for providing secure communication between a first module and a second module within a vehicle communication network:
   providing, within the first module, a first anti-replay counter;
   providing, within the second module, a second anti-replay counter;
   transmitting, at a periodic rate, a message from the first module to the second module over the vehicle communication network, wherein the message includes a partial counter including only a portion of the contents of the first anti-replay counter;
   authenticating the message at the second module based on the partial counter; and
   periodically sending a counter sync message comprising the entire first anti-replay counter from the first module to the second module at a rate that is lower than a rate at which the message is sent from the first module to the second module.

2. The method of claim 1, wherein the partial counter includes then least significant bits of the first anti-replay counter, wherein n is greater than four and less than seven.

3. The method of claim 2, wherein n is approximately 7 to 10 percent of the total length of the first anti-replay counter.

4. The method of claim 1, wherein the partial counter includes the n least significant bits of the first anti-replay counter, and wherein authenticating the message based on the partial counter includes determining whether the partial counter is less than or equal to the n least significant bits of the second anti-replay counter.

5. The method of claim 4, wherein, when the partial counter is less than or equal to the n least significant bits of the second anti-replay counter, authenticating the message includes using a temporary counter constructed from a portion of the second anti-replay counter and a portion of the partial counter, and attempting to verify a message authentication code of the message based on the temporary counter.

6. The method of claim 5, wherein, when the partial counter is greater than the n least significant bits of the second anti-replay counter, authenticating the message includes using a temporary counter constructed from an incremented portion of the second anti-replay counter and a portion of the partial counter, and attempting to verify a message authentication code of the message based on the temporary counter.

7. The method of claim 1, further including and using a tentative counter based on the counter sync message to authenticate the message until a predetermined number of successful authentications have taken place.

8. A secure communication system for a vehicle, comprising:
   a first module having a first anti-replay counter, the first module configured to transmit, at a periodic rate, a message over a vehicle communication network;
   a second module having a second anti-replay counter, the second module configured to receive the message over the vehicle communication network;

wherein the message includes a partial counter including only a portion of the contents of the first anti-replay counter; and the second module is configured to authenticate the message based on the partial counter;

wherein the first module periodically sends a counter sync message comprising the entire first anti-replay counter from the first module to the second module at a rate that is lower than a rate at which the message is sent from the first module to the second module.

9. The system of claim 8, wherein the partial counter includes the n least significant bits of the first anti-replay counter, wherein n is greater than four and less than seven.

10. The system of claim 9, wherein n is approximately 7 to 10 percent of the total length of the first anti-replay counter.

11. The system of claim 8, wherein the partial counter includes the n least significant bits of the first anti-replay counter, and wherein authenticating the message based on the partial counter includes determining whether the partial counter is less than or equal to the n least significant bits of the second anti-replay counter.

12. The system of claim 8, wherein the second module uses a tentative counter based on the counter sync message to authenticate the message until a predetermined number of successful authentications have taken place.

13. A module for a vehicle comprising:
a processor;
a memory for storing machine-readable software instructions and a local anti-replay counter;
wherein the processor is configured to execute the machine-readable software instructions to perform the steps of:

receiving, at a periodic rate, a message over a communication network of the vehicle from a first external module, wherein the message includes a partial counter including only a portion of the contents of an authoritative anti-replay counter stored at the first external module;

authenticating the message based on the partial counter; and periodically receiving a counter sync message from the first external module comprising the entire first authoritative anti-replay counter at a rate that is lower than a the periodic rate at which the message is received.

14. The module of claim 13, wherein the partial counter includes the n least significant bits of the authoritative anti-replay counter, wherein n is greater than four and less than seven.

15. The module of claim 14, wherein n is approximately 7 to 10 percent of the total length of the authoritative anti-replay counter.

16. The module of claim 13, wherein the partial counter includes the n least significant bits of the authoritative anti-replay counter, and wherein authenticating the message based on the partial counter includes determining whether the partial counter is less than or equal to the n least significant bits of the local anti-replay counter.

17. The module of claim 13, wherein the processor is further configured to use a tentative counter based on the counter sync message to authenticate the message until a predetermined number of successful authentications have taken place.

* * * * *